(12) United States Patent
Paxie et al.

(10) Patent No.: US 7,284,109 B1
(45) Date of Patent: Oct. 16, 2007

(54) PARTITION CREATION

(75) Inventors: Andrew Leslie Paxie, Sandringham (NZ); Robert Stutton, Northcote (NZ)

(73) Assignee: Symantec Corporation, Cupertino, CA (US)

( * ) Notice: Subject to any disclaimer, the term of this patent is extended or adjusted under 35 U.S.C. 154(b) by 666 days.

(21) Appl. No.: 10/719,068

(22) Filed: Nov. 21, 2003

(51) Int. Cl.
*G06F 12/00* (2006.01)
*G06F 13/00* (2006.01)
*G06F 13/28* (2006.01)

(52) U.S. Cl. .................................. 711/173
(58) Field of Classification Search .............. 711/173
See application file for complete search history.

(56) References Cited

U.S. PATENT DOCUMENTS

| | | | |
|---|---|---|---|
| 5,655,119 A | 8/1997 | Davy | 395/616 |
| 5,675,769 A | 10/1997 | Ruff et al. | 395/497.04 |
| 5,761,680 A | 6/1998 | Cohen et al. | 707/206 |
| 5,832,513 A | 11/1998 | Kennedy | 707/202 |
| 6,108,759 A | 8/2000 | Orcutt et al. | 711/173 |
| 6,185,575 B1 | 2/2001 | Orcutt | 707/200 |
| 6,330,653 B1 * | 12/2001 | Murray et al. | 711/173 |

OTHER PUBLICATIONS

Mendelson, Edward. PartitionMagic streamlines and extends you hard disk. Mar. 26, 1996. PC Magazine, v15, n6, p. 56.*
Ts'o, Theodore Y., Tweedie, Stephen, Planned Extensions to the Linux Ext2/Ext3 Filesystem, Proceedings of the Freenix Tack: 2002 USENIX Annual Technical Conference, USENIX Association, Monterey California, Jun. 10-15, 2002.

* cited by examiner

*Primary Examiner*—Matthew Kim
*Assistant Examiner*—Edward J Dudek
(74) *Attorney, Agent, or Firm*—Van Pelt, Yi & James LLP

(57) ABSTRACT

A system and a method are disclosed for creating a new partition. The technique includes initially allocating initially available sectors in a designated new partition area of a source partition to the new partition and subsequently allocating additional sectors in the designated new partition area of the source partition to the new partition that have subsequently become available.

46 Claims, 9 Drawing Sheets

Partition vs. Time - Virtual Partition File Fully Allocated During Initialization

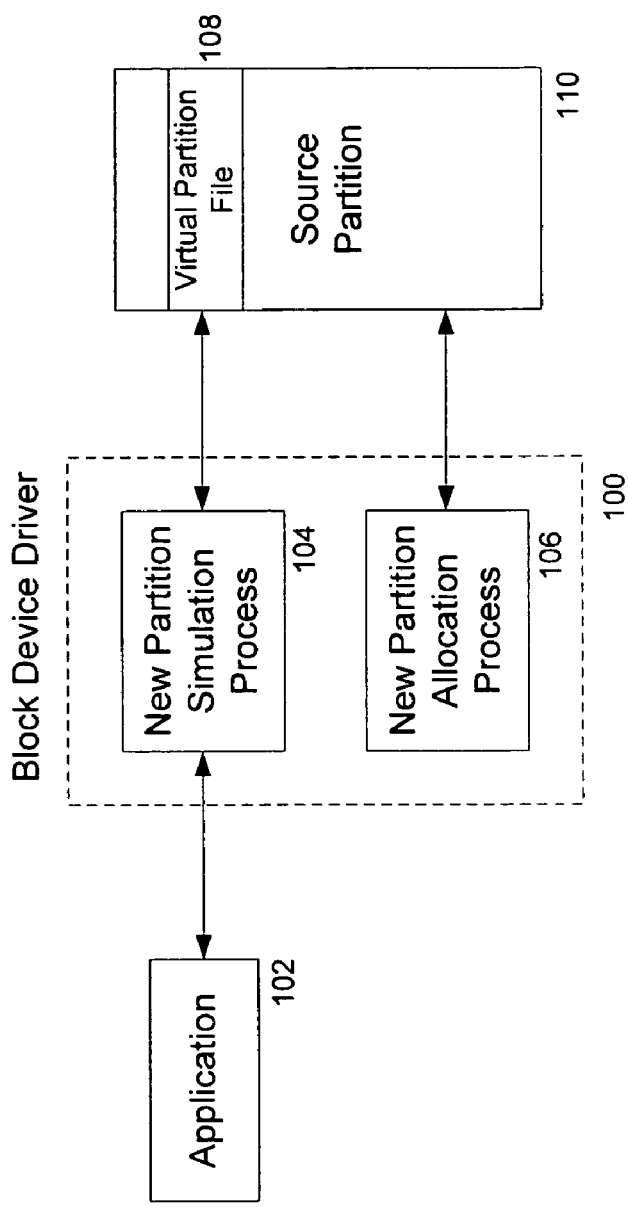
FIG 1 - High Level Logical Diagram

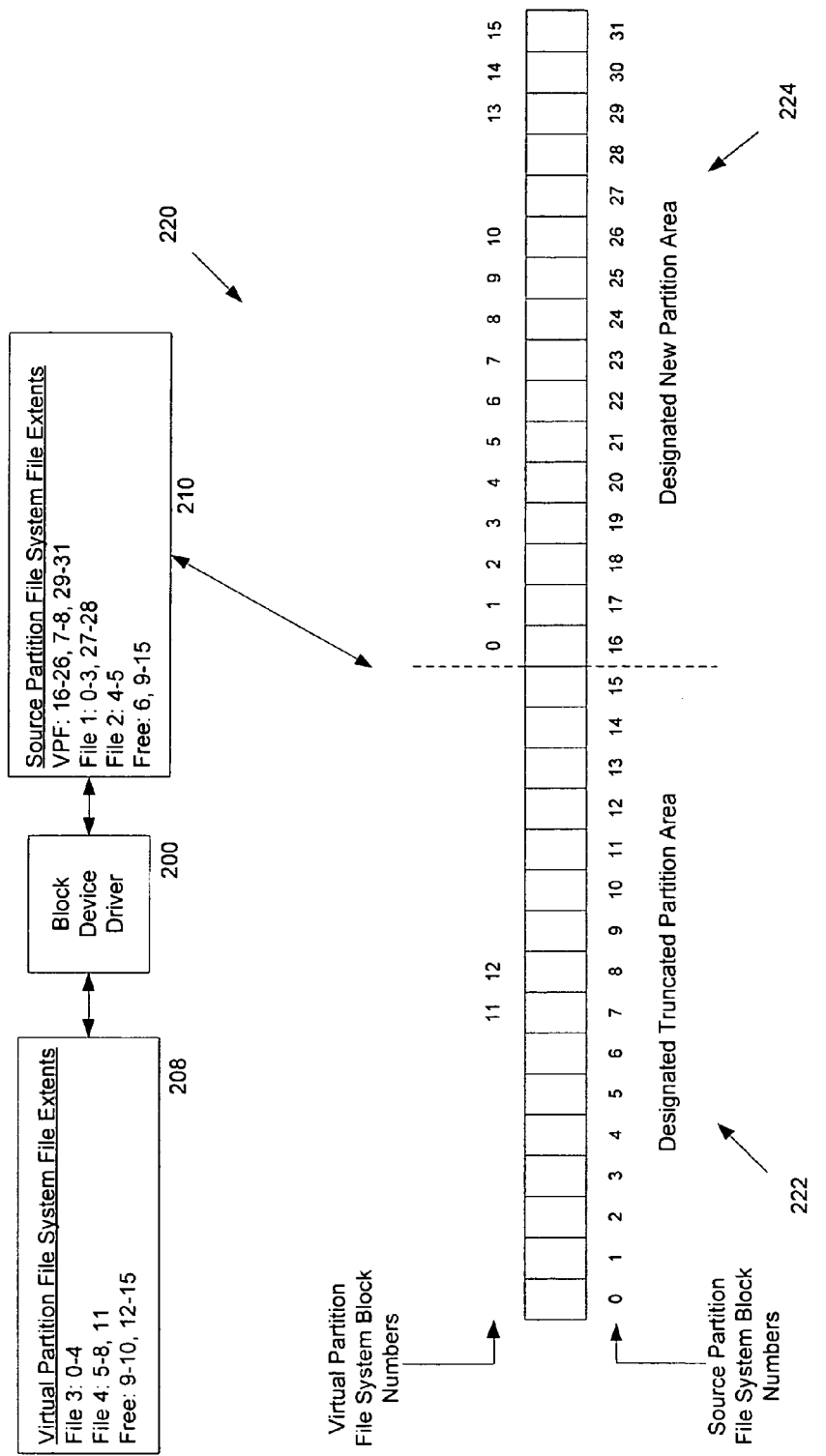
FIG 2A - Logical Diagram - Virtual Partition File Fully Allocated During Initialization

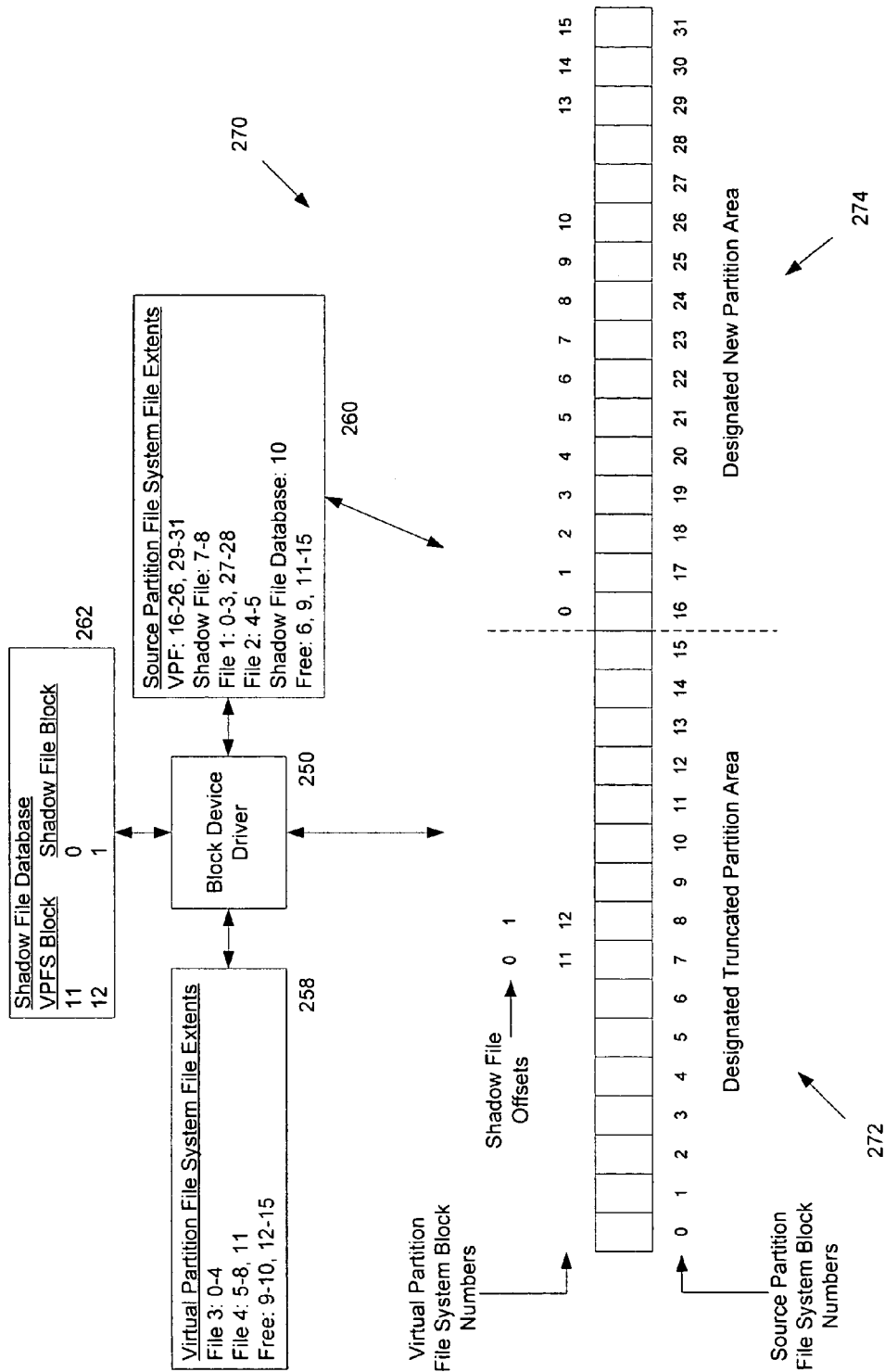
FIG 2B - Logical Diagram - Virtual Partition File Incrementally Allocated

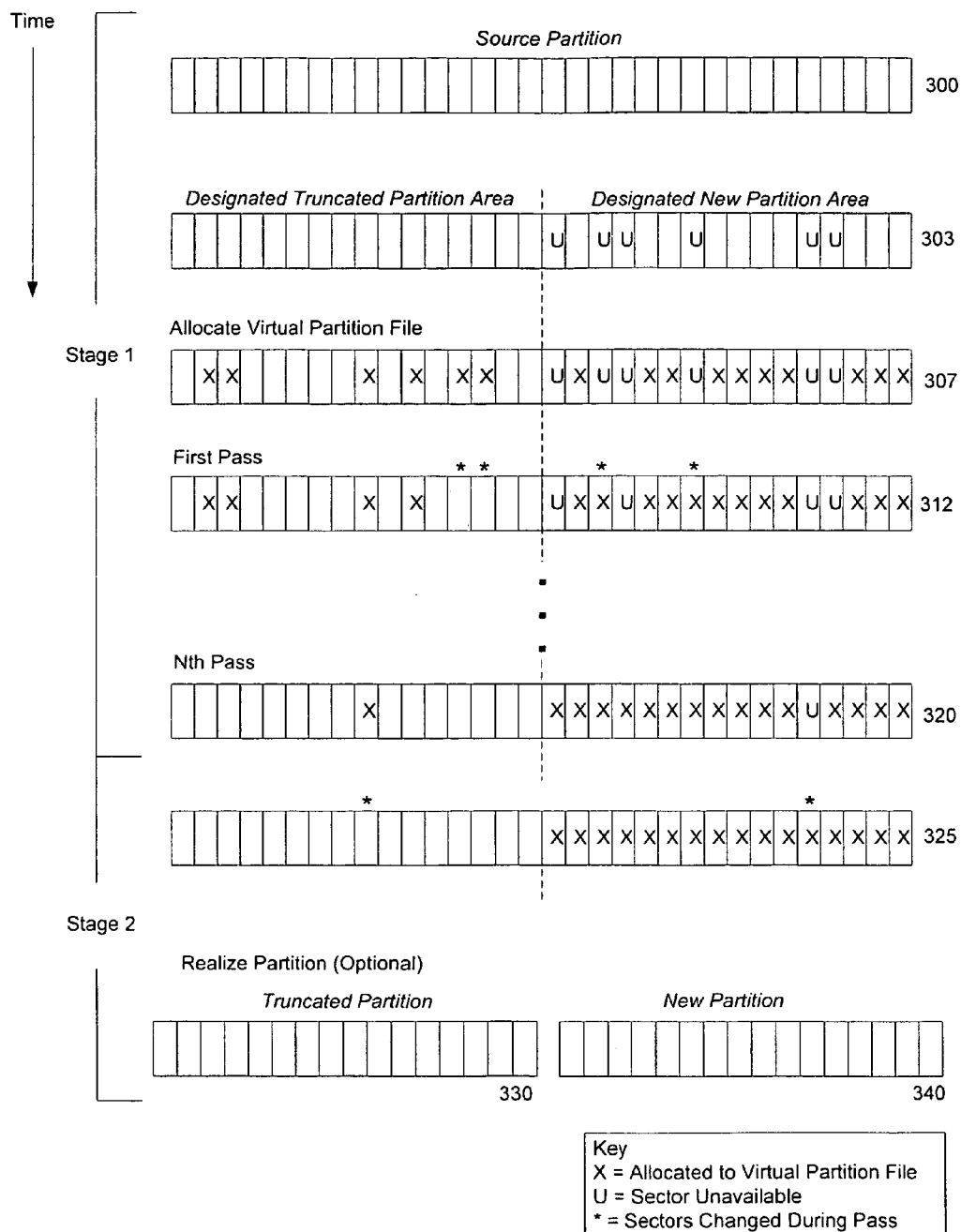
FIG 3A - Partition vs. Time - Virtual Partition File Fully Allocated During Initialization

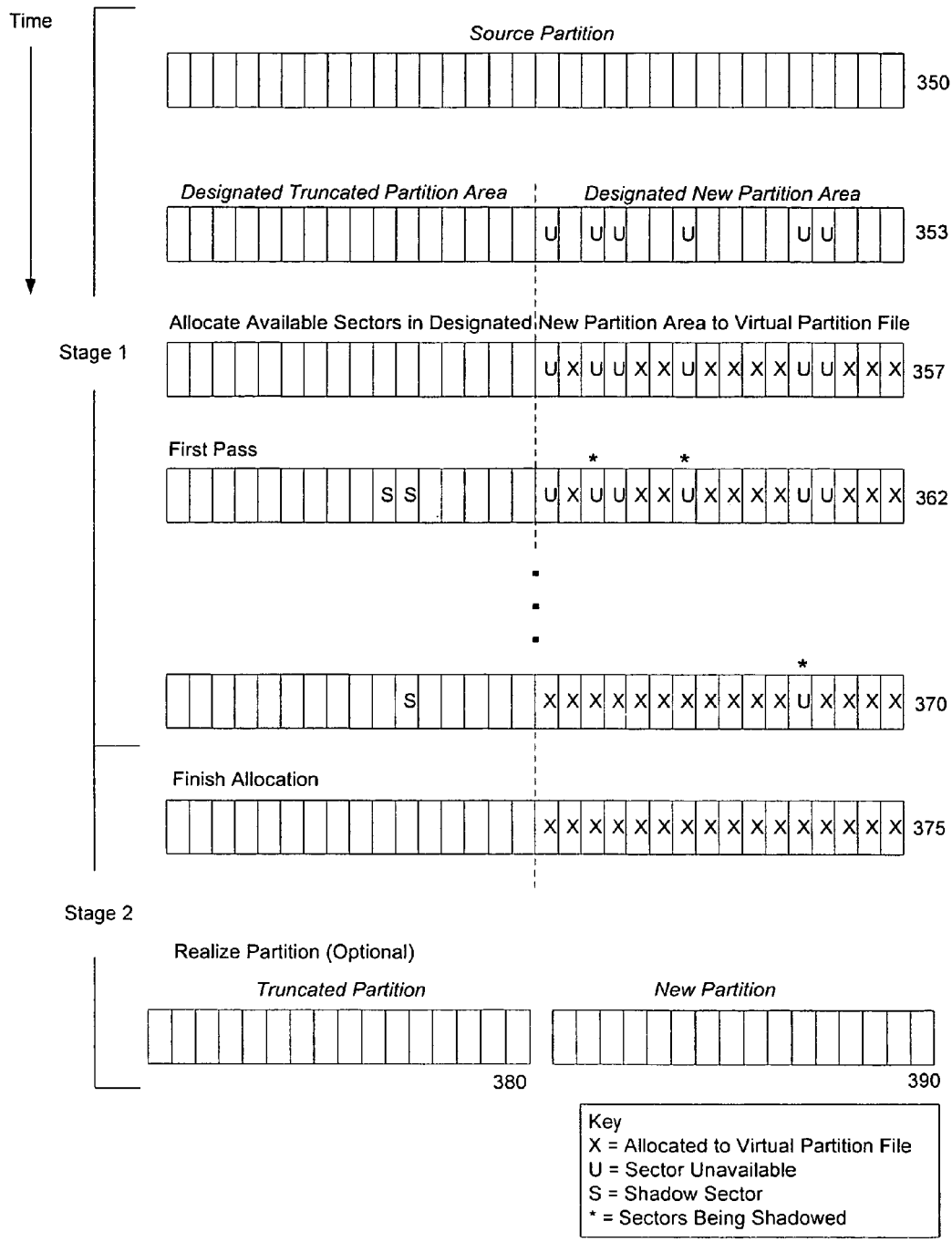
FIG 3B - Partition vs. Time - Virtual Partition File
Incrementally Allocated

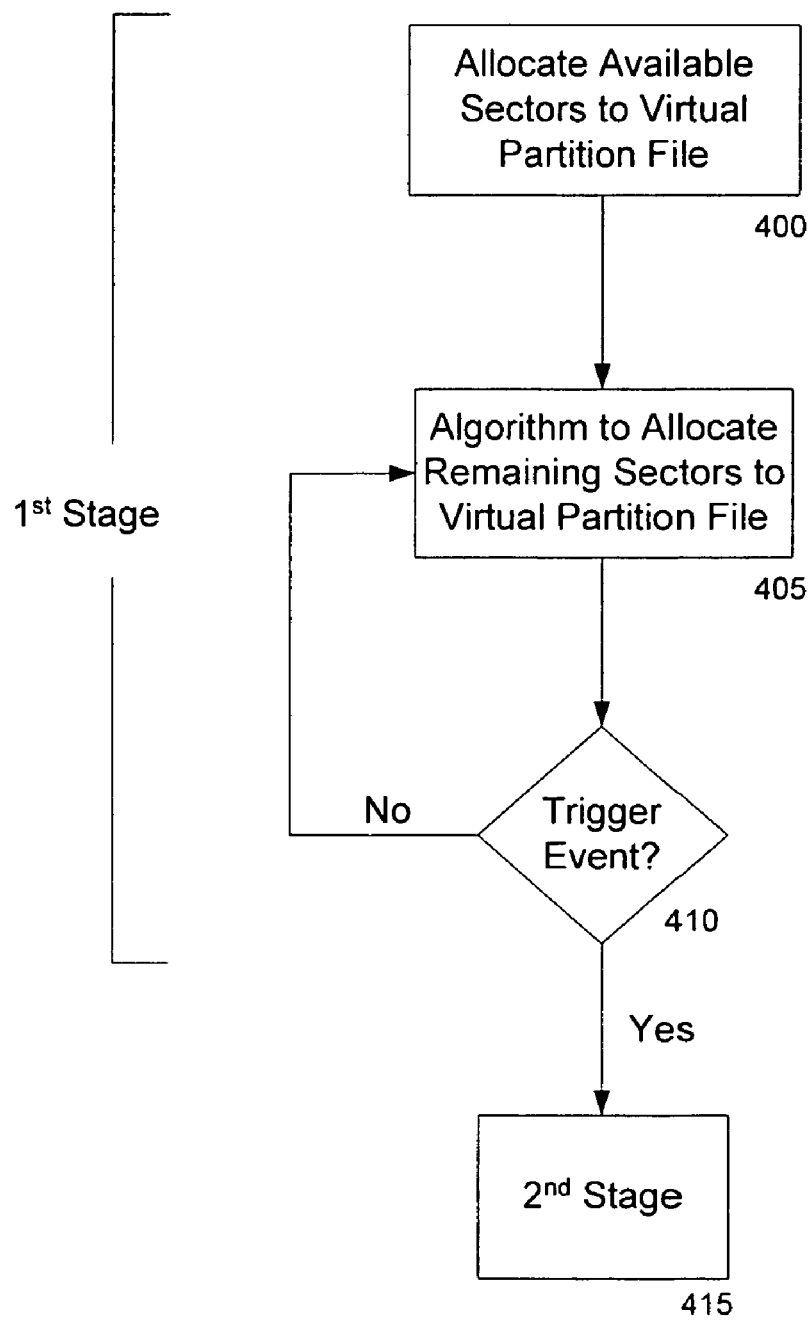
FIG 4 - New Partition Allocation Process

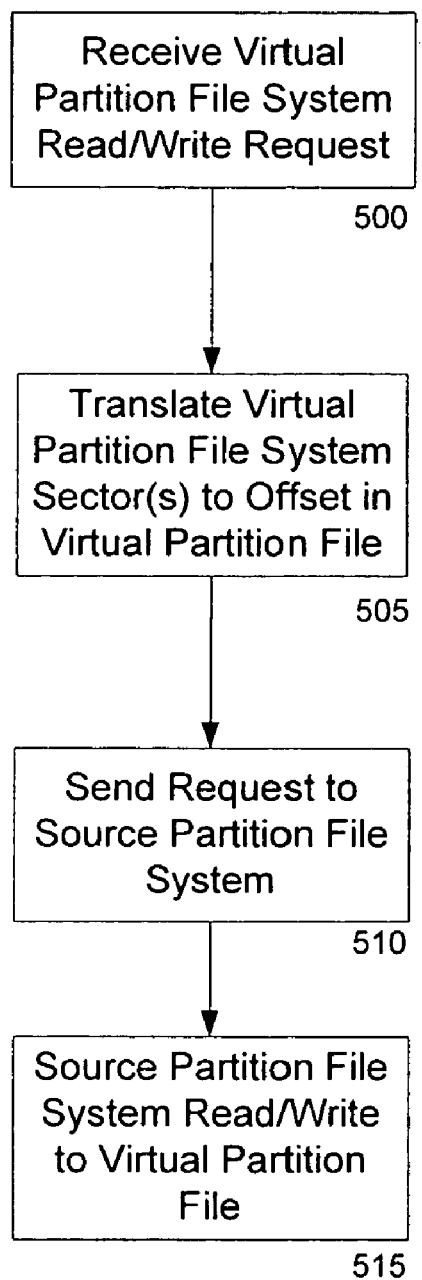
FIG 5A - New Partition Simulation Process - Virtual Partition File Fully Allocated During Initialization

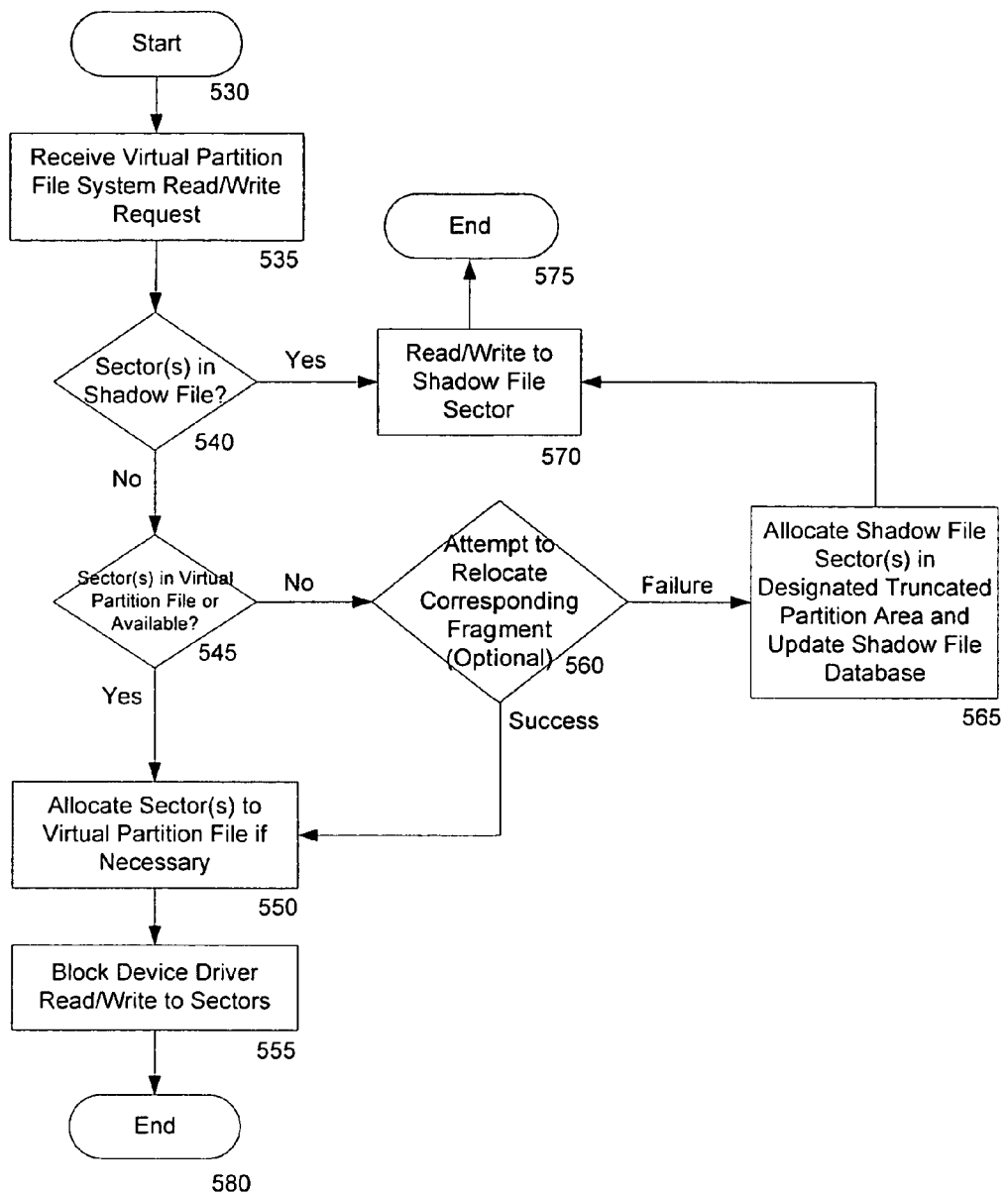
FIG 5B - New Partition Simulation Process - Virtual Partition File Incrementally Allocated

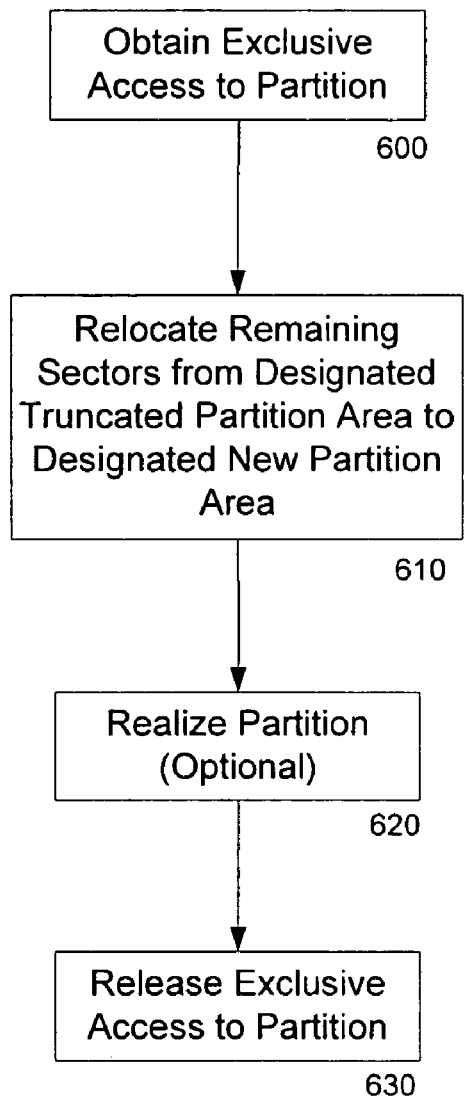
FIG 6 - 2nd Stage of New Partition Allocation Process

PARTITION CREATION

FIELD OF THE INVENTION

The present invention relates generally to computer data storage. More specifically, a partition creation method is disclosed.

BACKGROUND OF THE INVENTION

Computer systems are often shipped with hard drives formatted in a way that does not suit the system's intended use. For example, the disk may be initially formatted to have one partition occupying the entire capacity of the disk whereas what may be required is a second partition occupying a portion of the disk in conjunction with the first partition. Uses for the second partition may include providing storage for a file system containing system backups, disaster recovery files, diagnostic or repair applications, or any other purpose for which the user wishes to use the storage.

It may be inconvenient or technically infeasible to add additional hard disk storage to the system. In addition, there may be data already on the first partition that, for certain processes that create a second partition, has to be backed up and later restored.

A partition may be truncated to create to the right of the truncated partition free space (sectors not allocated to any partition) or a new partition. The new partition may have no file system, a newly formatted file system, or a formatted file system populated with data files, the region incorporating sectors originally belonging to the source partition.

Best practice storage management processes have the capability of modifying the current system to produce a new storage format while avoiding the cost of obtaining additional hard disk storage or other backup media and lost time. Time may be lost to transferring files off the first file system, configuring the hard drive with the intended partition and file system layout, transferring the backed up files to the first file system, system reboots between process steps, or system unavailability for general use at various points during the process. Existing methods for partition creation evidence one or more of these drawbacks.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a diagram illustrating a partition creation method.

FIG. 2A is a diagram illustrating a state of a partition at some point during a partition creation when a virtual partition file is fully allocated during initialization.

FIG. 2B is a diagram illustrating a state of a partition at some point during a partition creation when the virtual partition file is incrementally allocated.

FIG. 3A is a diagram illustrating a partition vs. time when the virtual partition file is fully allocated during initialization.

FIG. 3B is a diagram illustrating a partition vs. time when the virtual partition file is incrementally allocated.

FIG. 4 is a flowchart illustrating a new partition allocation process.

FIG. 5A is a flowchart illustrating a new partition simulation process when a virtual partition file is allocated fully during initialization.

FIG. 5B is a flowchart illustrating a new partition simulation process when sectors are allocated to a virtual partition file incrementally.

FIG. 6 is a flowchart illustrating a second stage of a new partition allocation process.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A method for creating a new partition is disclosed. The method includes initially allocating initially available sectors in a designated new partition area of a source partition to the new partition and subsequently allocating additional sectors in the designated new partition area of the source partition to the new partition that have subsequently become available. The new partition may remain a virtual partition or may be transformed into an actual partition. Both embodiments are described below.

For purposes of explanation, the underlying storage allocation unit is described in terms of sectors. The underlying storage allocation unit may not be sectors. For example, the underlying storage allocation unit may be clusters.

The partition creation method initially performs partition manipulation in the current operating environment with the partition undergoing modification still available for use during the first stage. These manipulations can be performed in the background while the system's user(s) continue to use the system for general purpose computing. They can be performed gradually. For example, the user may constrain the manipulations so that they use no more than 15% of CPU or 10% of disk I/O bandwidth.

Alternatively, the partition manipulation may proceed in the foreground. The user may allow the manipulation to utilize as much CPU, RAM, or disk bandwidth resources as required to complete the manipulation in the minimum elapsed time.

During the first stage, users of the system/volume can continue using the volume until exclusive access is required. The stage when exclusive access is required is referred to as the second stage. Operations that require exclusive access to the volume may be delayed until the user indicates it is a convenient time to perform them or until another criterion is met. In some circumstances the manipulation may be completed without a system reboot. No additional storage may be required and the time that the system is unavailable for use can be minimized.

FIG. 1 is a diagram illustrating a partition creation method. A block device driver 100 presents the illusion that the desired partition already exists and performs necessary background operations to realize the partition on the underlying storage. The block device driver may be implemented within an application or an operating system. The block device driver may be realized as a 'kernel mode' device driver. The block device driver may respond to requests from an application 102. Clients of the block device driver may include a file system driver that can format a file system on the block device and also use the block device to read or write data to the file system in response to requests from the application.

A block device is a device that has a block (storage allocation unit) as its smallest transfer unit. Typically a block device is a network or storage device. In contrast, a character device has a character as its smallest transfer unit. A block device and an associated block device driver are included in this embodiment. In other embodiments, other devices such as a character device and an associated driver may perform a similar function.

Block device driver 100 includes a new partition simulation process 104 and a new partition allocation process 106. Typically, these processes execute in parallel. New partition simulation process 104 presents the illusion that the new partition already exists. New partition allocation process 106 performs the background operations to realize the partition on the underlying storage.

In order to manage the storage within the source partition, block device driver 100 creates for its exclusive use a virtual partition file 108 in source partition 110. Virtual partition file 108 is not necessarily contiguous.

Available space or sectors refers to storage that is not in use, or free. Unavailable space or sectors refers to storage that is in use, or not free. In one embodiment, virtual partition file 108 is allocated fully from available space within the partition during block device driver initialization. In general, there is not enough available space in the designated new partition area, so available sectors in the designated truncated partition area are allocated to the virtual partition file. In another embodiment, the virtual partition file is incrementally allocated.

As used herein, source partition refers to the partition that exists before the partition creation process begins and includes a designated truncated partition area and a designated new partition area. Designated truncated partition area refers to the part of a source partition that is truncated during new partition creation. In some embodiments, the designated new partition area includes free space immediately adjacent to the right edge of the source partition. Designated new partition area refers to the part of a source partition that is created during new partition creation. Sectors allocated to the virtual partition file are part of the virtual partition file system. During the second stage, the virtual partition file system becomes the file system for the new partition. New partition refers to the sectors that are allocated to the virtual partition file in their correct locations in a designated new partition area. During the second stage, the designated new partition area becomes the new partition. The new partition may remain a virtual partition or may be realized during the second stage. Realization refers to transformation of a new partition into an actual partition. Correct location refers to sectors in the virtual partition file that are located in their designated positions in the designated new partition area. In some embodiments, the designated positions are sequentially ordered starting from the left edge of the designated new partition area. In FIG. 2A, sectors with virtual partition file offsets 0-10 and 13-15 are in their correct locations. Truncated partition refers to the sectors in the designated truncated partition area that are not allocated to the virtual partition file. In FIG. 2A, during the second stage, designated truncated partition area 222 becomes a truncated partition.

FIG. 2A is a diagram illustrating a state of a partition at some point during a partition creation when a virtual partition file is fully allocated during initialization. The method is illustrated for a simplified source partition 220.

Source partition 220 includes 32 sectors divided into a designated truncated partition area 222 and a designated new partition area 224. Sectors are referenced according to source partition file system 210 unless otherwise indicated. Sectors are indexed 0-31 by source partition file system 210. Designated truncated partition area 222 includes sectors 0-15. Designated new partition area 224 includes sectors 16-31 and is the area of partition 220 in the process of becoming the new partition. In general, designated new partition area 224 may include any number of sectors, up to the limit of the free space in the source partition and the contiguous free space to the right of the source partition, whichever is exhausted first.

The first stage includes a new partition allocation process and a new partition simulation process. During the first stage, users of the system/volume can continue using the volume until exclusive access is required. The stage when exclusive access is required is referred to as the second stage.

In the new partition allocation process, on block device driver initialization, the virtual partition file is allocated fully from available space within the partition. The virtual partition file is not necessarily contiguous. The virtual partition file is allocated to the extent possible from available space within designated new partition area 224. Additional sectors are temporarily allocated from free sectors in designated truncated partition area 222 to substitute for unavailable sectors in designated new partition area 224.

Source partition file system 210 includes the virtual partition file in sectors 16-26, 7-8, and 29-31. Sectors 7-8 may be located in designated truncated partition area 222 because sectors 27-28 may have been unavailable when the virtual partition file was allocated. Block device driver 200 attempts to relocate the sectors in the virtual partition file in designated truncated partition area 222 to their correct locations in designated new partition area 224. For example, block device driver 200 may periodically attempt to relocate source partition file system sectors 27-28 to designated truncated partition area 222, and if it succeeds, relocate the sectors with virtual partition file offsets 11-12 to their correct locations in designated new partition area 224.

In the new partition simulation process, block device driver 200 services read and write requests for the virtual partition by sending virtual partition file offsets to the source partition file system. For example, block device driver 200 receives a request to write to the second sector of file 4, translates this to a virtual partition file offset of 6, and sends the request to source partition file system 210. Source partition file system 210 writes to sector 22 in source partition file system 210.

Note that there may not be a one-to-one correspondence between the virtual partition file offset and the underlying storage allocation unit of the source partition file system. For example, the virtual partition file system may have a 2048 byte cluster size and the source partition file system may have a 4096 byte cluster size. A constraint may be to set the dividing line at a multiple of the cluster size of the source partition file system.

During the second stage, block device driver 200 obtains exclusive access to source partition 220, relocates any remaining virtual partition file sectors from designated truncated partition area 222 to designated new partition area 224, and releases exclusive access to source partition 220. Before releasing exclusive access to source partition 220, the virtual partition may be realized, or transformed into an actual partition. The new partition is located in designated new partition area 224.

FIG. 2B is a diagram illustrating a state of a partition at some point during a partition creation when the virtual partition file is incrementally allocated. An advantage of this embodiment is the virtual partition file doesn't have to be allocated all at once. The method is illustrated for a simplified source partition 270.

Source partition 270 includes 32 sectors divided into a designated truncated partition area 272 and a designated new partition area 274. Sectors are referenced according source partition file system 260 unless otherwise indicated. Sectors are indexed 0-31 by source partition file system 260. Designated truncated partition area 272 includes sectors 0-15. Designated new partition area 274 includes sectors 16-31 and is the area of partition 270 in the process of becoming the new partition. In general, designated new partition area 274 may include any number of sectors, up to the limit of the free space in the source partition and the contiguous free space to the right of the source partition, whichever is exhausted first.

The first stage includes a new partition allocation process and a new partition simulation process. During the first stage, users of the system/volume can continue using the volume until exclusive access is required. The stage when exclusive access is required is referred to as the second stage.

In one embodiment, during the new partition allocation process, on block device driver initialization, the virtual partition file is allocated to the extent possible from available space within the designated new partition area. The virtual partition file is not necessarily contiguous. Additional sectors are allocated subsequently by temporarily allocating sectors in designated truncated partition area 272 to substitute for unavailable sectors in designated new partition area 274. These temporarily allocated sectors are allocated to a shadow file. The shadow file may not be separate from the virtual partition file if this file is fully allocated during the initialization of the block device driver. Block device driver 250 has exclusive access to the shadow file and uses shadow file database 262 to keep track of shadowed sectors.

Source partition file system 260 includes the virtual partition file in sectors 16-26 and 29-31. Sectors 7-8 in designated truncated partition area 272 may have been allocated at some point to the shadow file because sectors 27-28 may have been unavailable when the virtual partition file was allocated. Block device driver 250 attempts to relocate the sectors allocated to the shadow file to their correct locations in designated new partition area 274. For example, block device driver 250 may periodically attempt to relocate source partition file system sectors 27-28 to designated truncated partition area 272, and if it succeeds, relocate the sectors with shadow file offsets 0-1 to their correct locations in designated new partition area 224.

In the new partition simulation process, block device driver 250 services read and write requests for the virtual partition by first consulting the shadow file to see if it contains the sector(s) that is (are) subject to the operation. For example, block device driver 250 receives a request to write to the fifth sector of File 4 and translates this to a virtual partition file system offset of 11. Block device driver 250 consults the shadow file for the presence of a virtual partition file system offset of 11 and translates the request to a shadow file offset of 0. Block device driver 250 sends the request to source partition file system 260. Source partition file system 260 writes to sector 7 in source partition file system 210.

Note that there may not be a one-to-one correspondence between the virtual partition file or shadow file offset and the underlying storage allocation unit of the source partition file system. For example, the virtual partition file system may have a 2048 byte cluster size and the source partition file system may have a 4096 byte cluster size. A constraint may be to set the dividing line at a multiple of the cluster size of the source partition file system.

Reads or writes involving virtual partition file offsets in both the virtual partition file and the shadow file may be split into operations on each of the files and those operations performed in sequence or in parallel. For example, if a request to read from virtual partition file sector 10 and 11 is received, the operation may be split into a read from virtual partition file sector 10 and a read from virtual partition file sector 11 (shadow file offset 0).

The second stage is similar to the second stage when the virtual partition file is fully allocated during initialization (FIG. 2A). During the second stage, block device driver 250 obtains exclusive access to source partition 270, relocates any remaining shadow file sectors to designated new partition area 224, and releases exclusive access to source partition 270. Before releasing exclusive access to source partition 270, the virtual partition may be realized, or transformed into an actual partition. The new partition is located in designated new partition area 274.

Creating a new partition when the virtual partition file is incrementally allocated may be preferred because the virtual partition file doesn't have to be allocated all at once. Another reason the shadow file approach may be preferred is that underlying file relocation APIs may not be able to relocate sectors that are exclusively allocated to the virtual partition file. There may be a file locking issue. However, storage manipulation needs to be coordinated with a shadow file database. For this reason, creating a new partition when the virtual partition file is fully allocated during initialization may be preferred for ease of implementation.

FIG. 3A is a diagram illustrating a partition vs. time when the virtual partition file is fully allocated during initialization. The method is illustrated for a simplified partition. Partition 300 is the simplified partition in its initial state. Partition 303 is divided into a designated truncated partition area and designated new partition area. The designated new partition area includes sectors that are unavailable.

During the first stage, on block device driver initialization, the virtual partition file is allocated fully from available space in partition 307. The virtual partition file is allocated to the extent possible from available space within the designated new partition area. Additional sectors are allocated by temporarily allocating sectors outside the designated new partition area to substitute for unavailable sectors in the designated new partition area. The block device driver may periodically attempt to relocate unavailable sectors in the designated new partition area to the designated truncated partition area, and relocate the sectors in the designated truncated partition area allocated to the virtual partition file to their correct locations in the designated new partition area. After the first pass, partition 307 may become partition 312. The asterisks indicate the previous and current locations of the virtual partition file sectors. After the Nth pass, partition 312 becomes partition 320. In partition 320, all the virtual partition file sectors in the designated truncated partition area except one have been relocated to the designated new partition area.

During the second stage, the block device driver obtains exclusive access to partition 320, relocates the remaining sector from the designated truncated partition area to the designated new partition area, and partition 320 becomes partition 325. The block device driver releases exclusive access to the partition. Optionally, before releasing exclusive access to partition 325, the virtual partition may be realized, or transformed into an actual partition. Partition 330 becomes the truncated partition and partition 340 becomes the new partition.

FIG. 3B is a diagram illustrating a partition vs. time when the virtual partition file is incrementally allocated. The method is illustrated for a simplified partition. Partition 350 is the simplified partition in its initial state. Partition 353 is divided into a designated truncated partition area and designated new partition area. The designated new partition area includes sectors that are unavailable.

During the first stage, on block device driver initialization, the virtual partition file is allocated to the extent possible from available space within the designated new partition area. Partition 353 becomes partition 357. Additional sectors are allocated subsequently by temporarily allocating sectors outside the designated new partition area to substitute for unavailable sectors in the designated new partition area. These temporarily allocated sectors are temporarily allocated to a shadow file. After the first pass, partition 357 becomes partition 362. The asterisks indicate the locations of the sectors being shadowed. Block device driver may periodically attempt to relocate the sectors allocated to the shadow file to their correct locations (for example, in sequence) in the designated new partition area. After the Nth pass, partition 362 becomes partition 370. In partition 370, all the shadow file sectors except one have been relocated to the designated new partition area.

During the second stage, the block device driver obtains exclusive access to partition 370, relocates the remaining shadow sector from the designated truncated partition area to the designated new partition area, and partition 370 becomes partition 375. Block device driver releases exclusive access to the partition. Optionally, before releasing exclusive access to partition 375, the virtual partition may be realized, or transformed into an actual partition. Partition 380 becomes the truncated partition and partition 390 becomes the new partition.

FIG. 4 is a flowchart illustrating a new partition allocation process. The first stage includes steps 400, 405, and 410. The second stage includes step 415 and is further described below. In the first stage, available sectors in the designated new partition area are allocated to a virtual partition file to the extent possible (step 400). Additional sectors may be allocated by temporarily allocating sectors outside the designated new partition area to substitute for unavailable sectors in the designated new partition area. The remaining sectors are allocated to the virtual partition file according to an algorithm (step 405). For example, the algorithm may comprise periodically attempting to relocate virtual partition file sectors or shadow file sectors to their correct locations. An algorithm may comprise attempting to relocate sectors associated with a file when the file closes. At some point, a trigger event transitions the process into the second stage (step 410). For example, the second stage may be triggered after N sectors have been allocated to the new partition. The trigger may be driven by an event such as the user instructing the system to go to the second stage.

FIG. 5A is a flowchart illustrating a new partition simulation process when a virtual partition file is allocated fully during initialization. The block device driver receives a read or write request for a sector in the virtual partition file system (step 500). The block device driver translates the virtual partition file system sector to an offset in the virtual partition file (step 505). The request is sent to the source partition file system (step 510). The source partition file system reads or writes to the sector in the virtual partition file (step 515).

FIG. 5B is a flowchart illustrating a new partition simulation process when sectors are allocated to a virtual partition file incrementally. The block device driver receives a read or write request for a sector in the virtual partition file system (step 535). The block device driver consults the shadow file to see if it contains the sector that is subject to the operation (step 540). If the sector is not in the shadow file, the block device driver determines if the sector is available or already allocated to the virtual partition file (step 545). If the sector is available or already allocated to the virtual partition file, the sector is allocated to the virtual partition file if necessary (step 550). The sector may already be allocated to the virtual partition file. The block device driver performs the read or write operation on the sector (step 555). In some embodiments, the block device driver performs the read or write operation on the sector similarly to steps 505-515.

If the sector is in the shadow file (step 540), the block device driver performs the read or write operation on the shadow file sector. If the sector isn't in the shadow file (step 540), and the sector is unavailable and not already allocated to the virtual partition file (step 545), the block device driver may attempt to relocate the fragment to which the sector belongs to available sectors in the designated truncated partition area (step 560). If the relocation is successful, the sector that the file relocation frees is allocated to the virtual partition file (step 550) and the block device driver performs the read or write operation on the sector (step 555). If the relocation fails then an available sector in the designated truncated partition area is allocated to a shadow file (step 565) and the shadow file database is updated. The data is read or written to a sector in the shadow file instead (step 570).

Step 560 may be skipped and the block device driver may not attempt to relocate the corresponding fragment. Available sectors in the designated truncated partition area are allocated to a shadow file (step 565) and the shadow file database is updated. The data is read or written to a sector in the shadow file instead (step 570).

Note that the read or write operations described above may involve more than one sector. Read or write operations involving sectors in both the virtual partition file and the shadow file may be split into operations on each of the files and those operations performed in sequence or in parallel.

FIG. 6 is a flowchart illustrating a second stage of a new partition allocation process (step 415). With first stage file relocation complete any deferred relocation operations in the shadow file must take place in a second stage where the truncation operation has exclusive access to the partition (step 600). This may require a reboot into another operating environment, but not necessarily. It may be possible to take the source partition offline. For example, the second stage may dismount the file system associated with the volume (which is an abstraction of the partition), perform the file relocation and remaining operations, then bring online (mount) the modified source partition and associated file system, and the new partition (if desired). The first stage relocation passes information such as the name of the shadow file and the name of the virtual partition file to the second stage file relocation operation.

If the virtual partition file is allocated fully during initialization, the block device driver relocates any remaining sectors from the designated truncated partition area to the designated new partition area (step 610). If the virtual partition file is incrementally allocated, any entries in the shadow file are processed so that at the end of this step the designated new partition area contains all the sectors that are to form the second partition (step 610). The block device driver relocates the sectors that have been shadowed in the shadow file out of the designated new partition area and if it succeeds, relocates the corresponding sectors in the shadow file to their correct locations. These sectors may then be allocated to the virtual partition file.

Optionally, the new partition is realized (step 620). This may include clean up work, such as removing the virtual partition file from the file system in the source partition before the second partition is created in the partition table. Storage allocated to the shadow file and shadow file database could be released. After this step, exclusive access to the partition is no longer required and is released (step 630).

A new partition may be created where free space to the right of the source partition exists and some fraction (up to 100%) of this space is to be included in the new partition in conjunction with sectors from the source partition. To manage this region of disk the block device driver may create a temporary unformatted partition in the space and lock this partition for its exclusive use. The block device driver has the capability to update sectors in this partition when requested.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of creating a new partition including:
   initially allocating initially available sectors in a designated new partition area of a source partition to the new partition; and
   subsequently allocating additional sectors in the designated new partition area of the source partition to the new partition that have subsequently become available; wherein subsequently allocating includes periodically checking when sectors in the designated new partition area become available.

2. A method of creating a new partition as, including:
   initially allocating initially available sectors in a designated new partition area of a source partition to the new partition; and
   subsequently allocating additional sectors in the designated new partition area of the source partition to the new partition that have subsequently become available; wherein subsequently allocating includes checking when sectors in the designated new partition area become available when a file closes.

3. A method of creating a new partition as recited in claim 1, further including temporarily allocating sectors outside the designated new partition area to substitute for unavailable sectors in the designated new partition area.

4. A method of creating a new partition as recited in claim 1, wherein initially allocating includes temporarily allocating sectors outside the designated new partition area to substitute for unavailable sectors in the designated new partition area.

5. A method of creating a new partition as recited in claim 1, wherein subsequently allocating includes temporarily allocating sectors outside the designated new partition area to substitute for unavailable sectors in the designated new partition area.

6. A method of creating a new partition as recited in claim 1, wherein some sectors in the designated partition area are not allocated initially because they are unavailable and subsequently allocating includes temporarily allocating sectors outside the designated new partition area to substitute for unavailable sectors in the designated new partition area.

7. A method of creating a new partition as recited in claim 1, further including a new partition allocation process and a new partition simulation process.

8. A method of creating a new partition including:
   initially allocating initially available sectors in a designated new partition area of a source partition to the new partition; and
   subsequently allocating additional sectors in the designated new partition area of the source partition to the new partition that have subsequently become available; and
   a new partition simulation process and a new partition allocation process, wherein the new partition simulation process includes:
     receiving a virtual partition file system request;
     translating the request to an offset in the virtual partition file;
     sending the request to the source partition file system; and
     processing of the request by the source partition file system.

9. A method of creating a new partition as recited in claim 1, further including a new partition simulation process and a new partition allocation process, wherein the new partition simulation process includes:
   receiving a virtual partition file system request;
   translating the request to an offset in the virtual partition file;
   sending the request to the source partition file system; and
   processing of the request by the source partition file system;
   wherein the request is for a read or write operation.

10. A method of creating a new partition as recited in claim 1, further including a new partition simulation process and a new partition allocation process, wherein the new partition simulation process includes:
   receiving a virtual partition file system request;
   consulting a shadow file for sectors related to the request;
   translating the request to an offset in the shadow file;
   sending the request to the source partition file system; and processing of the request by the source partition file system.

11. A method of creating a new partition as recited in claim 1, further including a new partition simulation process and a new partition allocation process, wherein the new partition simulation process includes:
receiving a virtual partition file system request;
allocating a sector to a shadow file;
sending the request to the source partition file system; and
processing of the request by the source partition file system.

12. A method of creating a new partition as recited in claim 1, wherein the new partition includes additional free space to the right of the source partition.

13. A method of creating a new partition as recited in claim 1, further including:
obtaining exclusive access to the source partition;
relocating remaining sectors from a designated truncated partition area to the designated new partition area; and
releasing exclusive access to the source partition.

14. A method of creating a new partition as recited in claim 1, further including realizing the new partition.

15. A system for creating a new partition, including a block device driver configured to:
initially allocate initially available sectors in a designated new partition area of a source partition to the new partition; and
subsequently allocate additional sectors in the designated new partition area of the source partition to the new partition that have subsequently become available;
wherein subsequently allocating includes periodically checking when sectors in the designated new partition area become available.

16. A computer program product for creating a new partition, the computer program product being embodied in a computer readable medium and comprising computer instructions for:
initially allocating initially available sectors in a designated new partition area of a source partition to the new partition; and
subsequently allocating additional sectors in the designated new partition area of the source partition to the new partition that have subsequently become available;
wherein subsequently allocating includes periodically checking when sectors in the designated new partition area become available.

17. A method of creating a new partition as recited in claim 1, wherein subsequently allocating includes checking when sectors in the designated new partition area become available when a file closes.

18. A method of creating a new partition as recited in claim 1, further including a new partition simulation process and a new partition allocation process, wherein the new partition simulation process includes:
receiving a virtual partition file system request;
translating the request to an offset in the virtual partition file;
sending the request to the source partition file system; and
processing of the request by the source partition file system.

19. A method of creating a new partition as recited in claim 2, wherein subsequently allocating includes periodically checking when sectors in the designated new partition area become available.

20. A method of creating a new partition as recited in claim 2, further including temporarily allocating sectors outside the designated new partition area to substitute for unavailable sectors in the designated new partition area.

21. A method of creating a new partition as recited in claim 2, wherein initially allocating includes temporarily allocating sectors outside the designated new partition area to substitute for unavailable sectors in the designated new partition area.

22. A method of creating a new partition as recited in claim 2, wherein subsequently allocating includes temporarily allocating sectors outside the designated new partition area to substitute for unavailable sectors in the designated new partition area.

23. A method of creating a new partition as recited in claim 2, wherein some sectors in the designated partition area are not allocated initially because they are unavailable and subsequently allocating includes temporarily allocating sectors outside the designated new partition area to substitute for unavailable sectors in the designated new partition area.

24. A method of creating a new partition as recited in claim 2, further including a new partition allocation process and a new partition simulation process.

25. A method of creating a new partition as recited in claim 2, further including a new partition simulation process and a new partition allocation process, wherein the new partition simulation process includes:
receiving a virtual partition file system request;
translating the request to an offset in the virtual partition file;
sending the request to the source partition file system; and
processing of the request by the source partition file system.

26. A method of creating a new partition as recited in claim 2, further including a new partition simulation process and a new partition allocation process, wherein the new partition simulation process includes:
receiving a virtual partition file system request;
translating the request to an offset in the virtual partition file;
sending the request to the source partition file system; and
processing of the request by the source partition file system;
wherein the request is for a read or write operation.

27. A method of creating a new partition as recited in claim 2, further including a new partition simulation process and a new partition allocation process, wherein the new partition simulation process includes:
receiving a virtual partition file system request;
consulting a shadow file for sectors related to the request;
translating the request to an offset in the shadow file;
sending the request to the source partition file system; and
processing of the request by the source partition file system.

28. A method of creating a new partition as recited in claim 2, further including a new partition simulation process and a new partition allocation process, wherein the new partition simulation process includes:
receiving a virtual partition file system request;
allocating a sector to a shadow file;
sending the request to the source partition file system; and
processing of the request by the source partition file system.

29. A method of creating a new partition as recited in claim 2, wherein the new partition includes additional free space to the right of the source partition.

30. A method of creating a new partition as recited in claim 2, further including:

obtaining exclusive access to the source partition;
relocating remaining sectors from a designated truncated partition area to the designated new partition area; and
releasing exclusive access to the source partition.

31. A method of creating a new partition as recited in claim 2, further including realizing the new partition.

32. A computer program product for creating a new partition, the computer program product being embodied in a computer readable medium and comprising computer instructions for:
   initially allocating initially available sectors in a designated new partition area of a source partition to the new partition; and
   subsequently allocating additional sectors in the designated new partition area of the source partition to the new partition that have subsequently become available; wherein subsequently allocating includes checking when sectors in the designated new partition area become available when a file closes.

33. A method of creating a new partition as recited in claim 8, wherein subsequently allocating includes periodically checking when sectors in the designated new partition area become available.

34. A method of creating a new partition as recited in claim 8, wherein subsequently allocating includes checking when sectors in the designated new partition area become available when a file closes.

35. A method of creating a new partition as recited in claim 8, further including temporarily allocating sectors outside the designated new partition area to substitute for unavailable sectors in the designated new partition area.

36. A method of creating a new partition as recited in claim 8, wherein initially allocating includes temporarily allocating sectors outside the designated new partition area to substitute for unavailable sectors in the designated new partition area.

37. A method of creating a new partition as recited in claim 8, wherein subsequently allocating includes temporarily allocating sectors outside the designated new partition area to substitute for unavailable sectors in the designated new partition area.

38. A method of creating a new partition as recited in claim 8, wherein some sectors in the designated partition area are not allocated initially because they are unavailable and subsequently allocating includes temporarily allocating sectors outside the designated new partition area to substitute for unavailable sectors in the designated new partition area.

39. A method of creating a new partition as recited in claim 8, further including a new partition allocation process and a new partition simulation process.

40. A method of creating a new partition as recited in claim 8, further including a new partition simulation process and a new partition allocation process, wherein the new partition simulation process includes:
   receiving a virtual partition file system request;
   translating the request to an offset in the virtual partition file;
   sending the request to the source partition file system; and
   processing of the request by the source partition file system;
   wherein the request is for a read or write operation.

41. A method of creating a new partition as recited in claim 8, further including a new partition simulation process and a new partition allocation process, wherein the new partition simulation process includes:
   receiving a virtual partition file system request;
   consulting a shadow file for sectors related to the request;
   translating the request to an offset in the shadow file;
   sending the request to the source partition file system; and
   processing of the request by the source partition file system.

42. A method of creating a new partition as recited in claim 8, further including a new partition simulation process and a new partition allocation process, wherein the new partition simulation process includes:
   receiving a virtual partition file system request;
   allocating a sector to a shadow file;
   sending the request to the source partition file system; and
   processing of the request by the source partition file system.

43. A method of creating a new partition as recited in claim 8, wherein the new partition includes additional free space to the right of the source partition.

44. A method of creating a new partition as recited in claim 8, further including:
   obtaining exclusive access to the source partition;
   relocating remaining sectors from a designated truncated partition area to the designated new partition area; and
   releasing exclusive access to the source partition.

45. A method of creating a new partition as recited in claim 8, further including realizing the new partition.

46. A computer program product for creating a new partition, the computer program product being embodied in a computer readable medium and comprising computer instructions for:
   initially allocating initially available sectors in a designated new partition area of a source partition to the new partition;
   subsequently allocating additional sectors in the designated new partition area of the source partition to the new partition that have subsequently become available; and
   a new partition simulation process and a new partition allocation process, wherein the new partition simulation process includes:
   receiving a virtual partition file system request;
   translating the request to an offset in the virtual partition file;
   sending the request to the source partition file system; and
   processing of the request by the source partition file system.

* * * * *